(12) United States Patent
King et al.

(10) Patent No.: US 6,526,208 B1
(45) Date of Patent: Feb. 25, 2003

(54) DISPERSION MANAGED FIBER OPTIC CABLE AND SYSTEM

(75) Inventors: Jonathan King, Epping (GB); Richard Epworth, Sawbridgeworth (GB); Marco Cavallari, London (GB); Alan Robinson, Harlow (GB); Benoit Charbonnier, Chingford (GB)

(73) Assignee: Nortel Networks Limited, St. Laurent (CA)

( * ) Notice: Subject to any disclaimer, the term of this patent is extended or adjusted under 35 U.S.C. 154(b) by 76 days.

(21) Appl. No.: 09/723,018

(22) Filed: Nov. 27, 2000

(51) Int. Cl.[7] ................................................ G02B 6/16
(52) U.S. Cl. ...................................... 385/123; 385/122
(58) Field of Search ........................... 385/123, 24, 37, 385/15, 122; 359/161

(56) References Cited

U.S. PATENT DOCUMENTS

| | | | |
|---|---|---|---|
| 5,191,631 A | 3/1993 | Rosenberg | 385/123 |
| 5,778,128 A | 7/1998 | Wildeman | 385/123 |
| 6,215,929 B1 * | 4/2001 | Byron | 359/173 |
| 6,229,935 B1 * | 5/2001 | Jones et al. | 385/24 |
| 6,307,985 B1 * | 11/2001 | Murakami et al. | 359/109 |
| 6,317,238 B1 * | 11/2001 | Bergano et al. | 359/161 |
| 6,321,015 B1 * | 11/2001 | Doran et al. | 385/123 |
| 6,360,045 B1 * | 3/2002 | Shoval et al. | 385/123 |

* cited by examiner

Primary Examiner—Ellen E. Kim
(74) Attorney, Agent, or Firm—Lee, Mann, Smith, McWilliams, Sweeney & Ohlson

(57) ABSTRACT

A hybrid optical fiber comprises a first fiber section comprising a fiber or a concatenation of fibers having first dispersion characteristics at a predetermined operating wavelength and a second fiber section coupled to the first fiber section to form the hybrid fiber. The first fiber dispersion characteristics are selected to maintain the signal dispersion within desired limits, whereas the second fiber is optimised for low loss. Dispersion compensation is provided in the first section of the fiber span where the signal intensity is highest, and therefore the region of the fiber span where these non-linearities have greatest effect. In the second section of the fiber span, the non-linear effects can be ignored, so it is optimised for low loss rather than for dispersion compensation.

15 Claims, 3 Drawing Sheets

DISPERSION MANAGED FIBER OPTIC CABLE AND SYSTEM

FIELD OF THE INVENTION

This invention relates to optical fiber cables and, more particularly, to optical fiber spans in which different types of optical fibers are used to achieve desired dispersion and loss characteristics.

BACKGROUND OF THE INVENTION

Signals transmitted through optical fibers are subject to various distorting and attenuating non-linear effects that limit their practical transmission distance. Typically, optical fibers are employed in fiber optic systems that consist of an optical terminal and a plurality of amplifiers/repeaters connected by optical fibers. The amplifier/repeaters are typically situated at regular intervals along a transmission path, and serve to boost the strength of the signal pulses, thereby overcoming the effects of attenuation. The total length of the transmission path is limited by phase shifts in the pulsed signals resulting from the optical nonlinearity of the optical fibers.

As a result of power-dependency of the nonlinear effects, the peaks of the optical pulses in the signal, where the optical power is largest, are repeatedly phase-shifted relative to the tails of the pulses, where power is low. These are Kerr-effect phase shifts. For an optical signal of a given power, the larger the effective area, the smaller the nonlinear phase shift. Therefore, the use of a fiber having a large effective area allows the launch power to be increased, and a lengthening of the span of optical fiber between amplifiers or repeaters.

Part of the nonlinear phase shift can be compensated by chromatic dispersion. However, where partially overlapping pulses undergo nonlinear phase shifts, different phase shifts are induced in the interacting pulses, which cannot be compensated by the same chromatic dispersion.

Another important characteristic of an optical fiber that affects signal transmission is its dispersion. Fiber dispersion causes phase changes in the frequency components of the signal transmitted through the fiber and alters the temporal distribution of the frequency spectrum, and therefore introduces distortion. High dispersion, fiber is, however, more resistant to WDM crosstalk effects, which arises from four wave mixing and cross phase modulation interactions with co-propagating signals at different wavelengths. These interactions are reduced by high local dispersion.

The attenuation provided by a particular fiber design also needs to be considered, as the use of fiber with higher attenuation requires higher power signals to be used.

Various fiber designs exist to provide desired dispersion or loss characteristics. For example, dispersion-shifted fibers (DSF), exhibit zero-dispersion near certain convenient operating wavelengths, for example, near 1550 nm. However, these fibers typically have moderately small effective area and a slightly higher attenuation than standard NSF) fiber. Although operation over long distances is possible in single channel operation, in WDM systems, nonlinear cross talk limits the channel spacing or launch power. Another type of commercially available fiber, known as non-zero dispersion shifted fiber (NZDSF), also often has a small effective area and exhibits a low to moderate dispersion over the transmission window. Other commercially available optical fibers, such as conventional single-mode (SMF) fibers, have large effective areas but exhibit high dispersions near 1550 nm.

It has been recognised that the properties of large effective area and near zero dispersion close to a particular convenient operating wavelength range would be desirable, but these two properties are generally not both found in a single commercially available optical fiber.

Hybrid fiber spans have been proposed, principally with the aim of reducing the total dispersion. One known "dispersion managed" optical fiber system comprises an optical fiber span which comprises alternating sections of positive dispersion and negative dispersion characteristics, wherein the total dispersion of the system is close to zero. These fibers provide improved resistance to non-linear crosstalk in WDM systems as a result of the locally high dispersion values. Thus, dispersion managed fibers combine the single channel advantages of low average dispersion with the WDM improvements resulting from the use of locally high dispersion fiber. However, the fibers used must be chosen to have specific dispersion values, and these fibers typically have small effective areas. In particular, the negative dispersion fiber usually requires a small core size and high refractive index difference, giving large scattering losses. As a result, these fiber spans have relatively high loss, for example 0.1 dB/km more than a conventional fiber span of non-dispersion shifted fiber. For a span of 80 km, this represents 8 dB additional loss. Furthermore, a large number of fiber splices may be required within a span which increase the cost and attenuation.

U.S. Pat. No. 5,191,631 describes a hybrid optical fiber comprising a first optical fiber coupled to a second fiber, where the first optical fiber has an effective area substantially larger and a dispersion characteristic substantially lower at a predetermined operating wavelength range than the corresponding properties of the second optical fiber. The first optical fiber with the larger effective area and positive dispersion characteristics is placed after the terminal or repeater and before the second optical fiber with the smaller effective area and negative dispersion characteristics. This requires only two separate fiber types. This arrangement is described as reducing non-linear effects, because the large effective area fiber is located in the high power part of the fiber span, and the large effective area thereby acts to reduce the optical power density.

Known hybrid fiber spans, including that disclosed in U.S. Pat. No. 5,191,631 have been designed to achieve near zero dispersion for the full span. The invention is based on the recognition that the majority of the deleterious effects of non-linearity down a span occurs during the first part of the span, and that dispersion arising in a linear part of the fiber span can be corrected. This approach enables the loss of the fiber span to be reduced.

SUMMARY OF THE INVENTION

According to the invention, there is provided a hybrid optical fiber, comprising:
   a first fiber section comprising a fiber or a concatenation of fibers having first dispersion characteristics at a predetermined operating wavelength;
   a second fiber section coupled to the first fiber section to form the hybrid fiber, wherein the first fiber dispersion characteristics are selected to maintain the signal dispersion within desired limits, and the second fiber is optical fiber having lower loss than the first fiber section.

The invention provides dispersion compensation in a first section of the fiber span, because this is where the signal intensity is highest, and therefore the region of the fiber span where these non-linearities have greatest effect. In the second section of the fiber span, the non-linear effects can be ignored, so that linear dispersion arises in the second fiber section, which can therefore be optimised for low loss rather than for dispersion compensation. Fibers can be selected with lower loss when low dispersion in the operating wavelength range is not a requirement. This linear dispersion can be corrected at the end of the fiber span, for example using a further fiber section of opposite dispersion sign, or using Bragg gratings, or other means. The use of unconstrained dispersion fiber for the (longer) second section enables the loss to be kept to a minimum, whereas low non-linear penalties are obtained in the high power region close to the amplifier.

The fibers preferably have largest possible effective area. However, if dispersion is managed in the first fiber section using negative dispersion fiber, the effective area in the first section may be lower than the effective area of the second fiber. The dispersion characteristics in the first section are used to control the degree of pulse broadening and the extent to which neighbouring pulses partially overlap.

The transition between fiber sections may lie near to the point at which the sum of the signal impairments due to fiber nonlinearity and the signal impairment due to fiber loss for the first dispersion managed fiber section is equal to the sum of the signal impairments due to fiber nonlinearity and the signal impairment due to fiber loss for the second fiber section. The transition between the first and second fiber sections is thus at the location at which it is first beneficial to change from the first fiber type to the second fiber type. This is therefore the optimum location for the change.

The length of the first section may be selected such that the signal intensity reduces by at least 3 dB in the first section, so that non-linear effects have very little influence in the second section. The length of the first section may be selected such that the signal intensity reduces by around 6 dB in the first section.

The first fiber section may comprise a fiber with a negative dispersion characteristic at the operating wavelength, or else a first fiber length with a positive dispersion characteristic at the operating wavelength and a second fiber length with a negative dispersion characteristic at the operating wavelength.

The second fiber section preferably comprises non-dispersion shifted fiber (NDSF), having positive dispersion at the operating wavelength, for example greater than 3 ps/nm/km. This type of conventional fiber is available with very low loss. Alternatively, the second fiber could be a pure silica core fiber (PSCF) which can be designed with an effective area up to 120 $\mu m^2$ with low loss.

The fiber is preferably used in an optical transmission system comprising a source for launching signals into the fiber, and an amplifier for receiving signals from the fiber. The amplifier may then comprises dispersion compensation elements for correcting the dispersion arising in the second fiber section.

The invention also provides methods for reducing the loss in a dispersion managed fiber.

BRIEF DESCRIPTION OF THE DRAWINGS

Examples of the invention will now be described in detail with reference to the accompanying drawings, in which.

DETAILED DESCRIPTION

Figure 1:
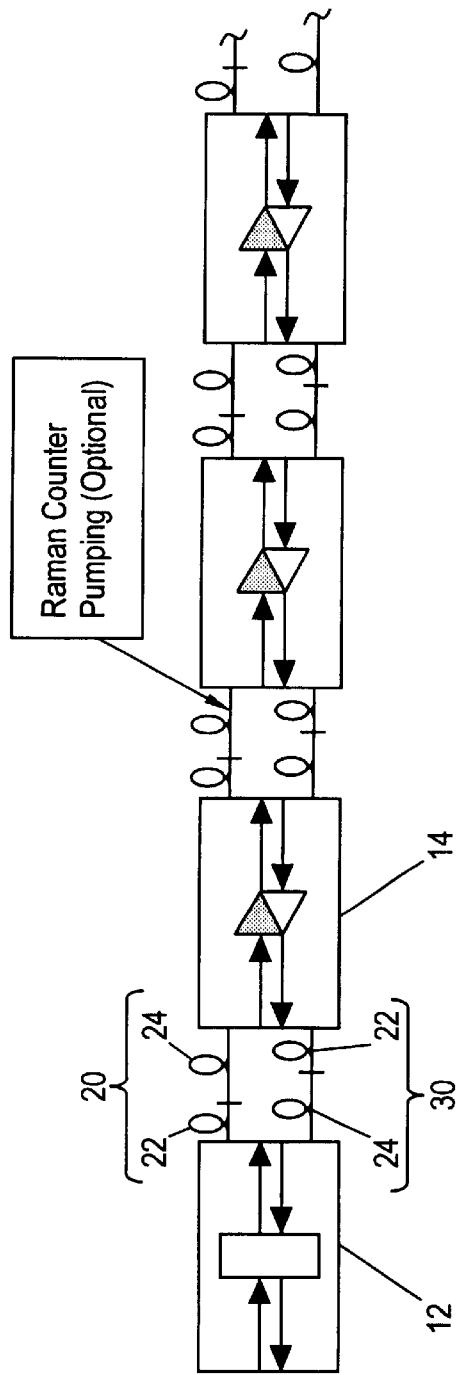
FIG. 1 is a schematic drawing of a hybrid optical fiber span in accordance with the invention.

Referring to FIG. 1, an example of an optical fiber transmission system 10 in accordance with the invention is shown. The system 10 includes an optical terminal 12 and repeaters 14, which may be all-optical amplifiers, or else they may be regenerators. Terminal 12 and repeater 14 are connected by two asymmetric fiber optic cables 20 and 30. Asymmetric fiber optic cable 20 is used for transmission from terminal 12 to repeater 14 and fiber optic cable 30 is used for transmission from repeater 14 to terminal 12. Each asymmetric fiber optic cable 20 and 30 consists of a relatively short first section 22 and a relatively long second section 24.

In accordance with the invention, the first fiber section 22 comprises a fiber or series of fibers having dispersion characteristics tailored to achieve desired control of the pulse dispersion. A second fiber section 24 is optimised for low loss, which may be possible with a large effective area fiber. The effective area of the fiber of the second section is likely to be higher than the effective area of the fiber of the first section, particularly negative dispersion fiber used in the first section. The second fiber is optimised for lowest loss, in terms of the fiber and the splices, with less consideration of the dispersion characteristics. For example, the second fiber may have dispersion greater than 3 ps/nm/km. The inventors have recognised that dispersion control is particularly important in the initial section of the fiber, where the signal intensity is highest and the signals are thereby affected most significantly by non-linear effects.

Figure 2:
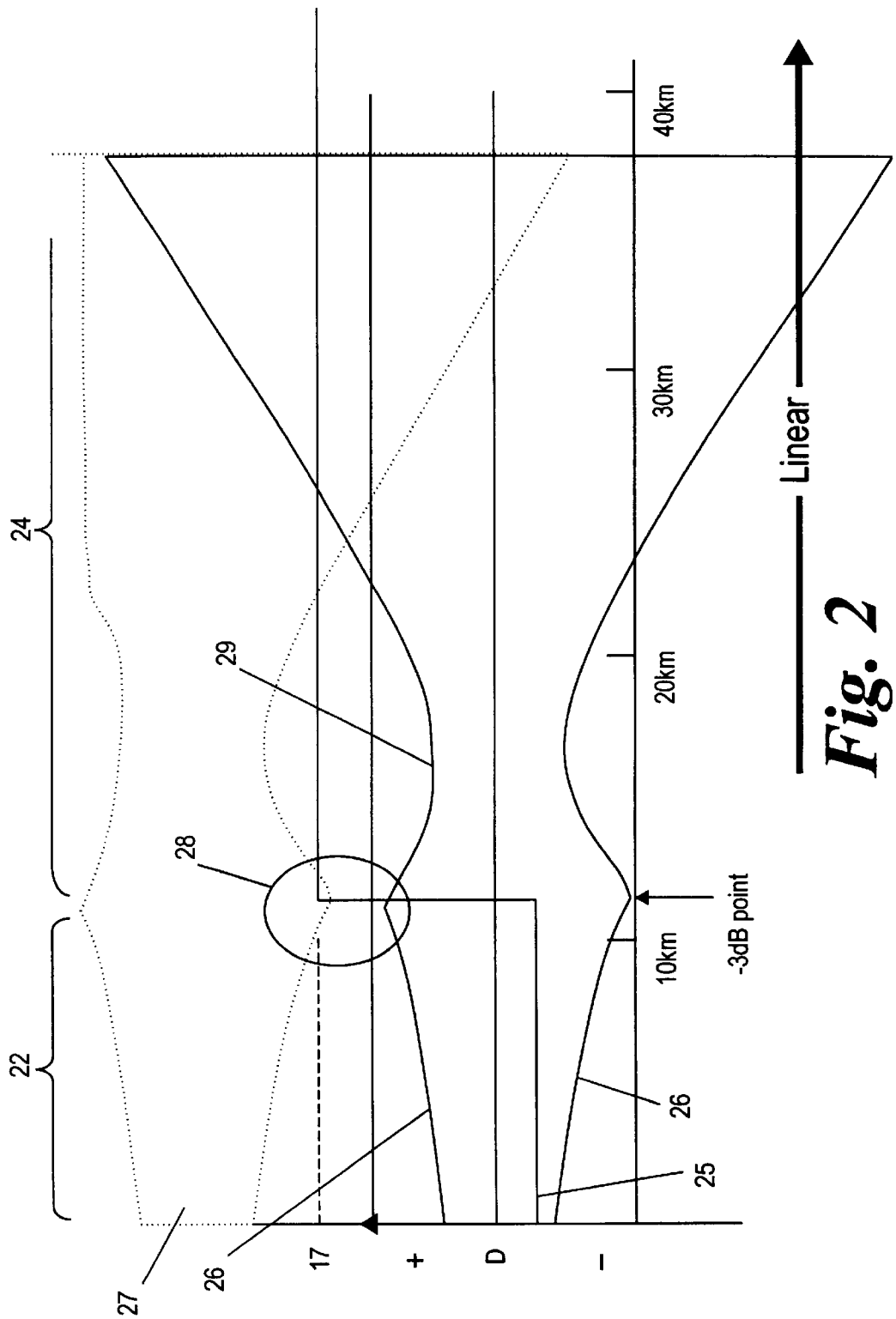
FIG. 2 illustrates the dispersion along the fiber for a first example of hybrid optical fiber span.

FIG. 2 shows one example of the dispersion characteristics for the first and second fiber sections 22, 24 and the resulting pulse spreading which arises. The dispersion is represented by plot 25.

In the example shown in FIG. 2, the first fiber section 22 has a negative dispersion of approximately −5 ps/nm/km, at the predetermined operating wavelength, which is typically arranged from 1530 to 1560 nm. The first fiber section comprises a single length of fiber, which may comprise dispersion shifted fiber or non-zero dispersion shifted fiber. Such fibers are typically lossy fibers (typically having loss greater than 0.21 dB/km, which is higher than the level which can be achieved with NDSF or PSCF) having a relatively low effective area of between 45 and 60 $\mu m^2$.

The length of the first fiber section is selected such that the dispersion control provided by the first fiber section 22 maintains the signal pulse spreading within desired limits for the part of a fiber span where non-linearity is high. In the example shown in FIG. 2, the first fiber section 22 has a length such that the signal intensity reduces to 50% (a 3 dB drop) at the end of the first fiber section 22. The second fiber section 24 comprises fiber with unconstrained dispersion, for example non-dispersion-shifted conventional fiber. This type of fiber typically has a positive dispersion of around 17 ps/nm/km at this operating wavelength, but has a much higher effective area of around 80 $\mu m^2$.

The envelope 26 in FIG. 2 represents the pulse width. The negative dispersion in the first fiber section 22 results in pulse broadening. The pulse width should be constrained to prevent pulse overlap with adjacent pulses 27. In particular, this should be avoided at the region 28 where adjacent pulse interaction is most likely. However, at the interface between the first and second fiber sections 22, 24 a relatively large pulse width is desirable, as this gives rise to a lower intensity pulse, which reduces WDM interaction.

In the second fiber section, the change in polarity of the dispersion characteristic gives rise to a reversal in the pulse width broadening. However, after the pulse width reaches a minimum 29 in the second fiber section, there is pulse broadening throughout the remainder of the second fiber section. However, this pulse broadening at low power levels is a linear effect which can easily be reversed at the repeater 14.

Figure 3:
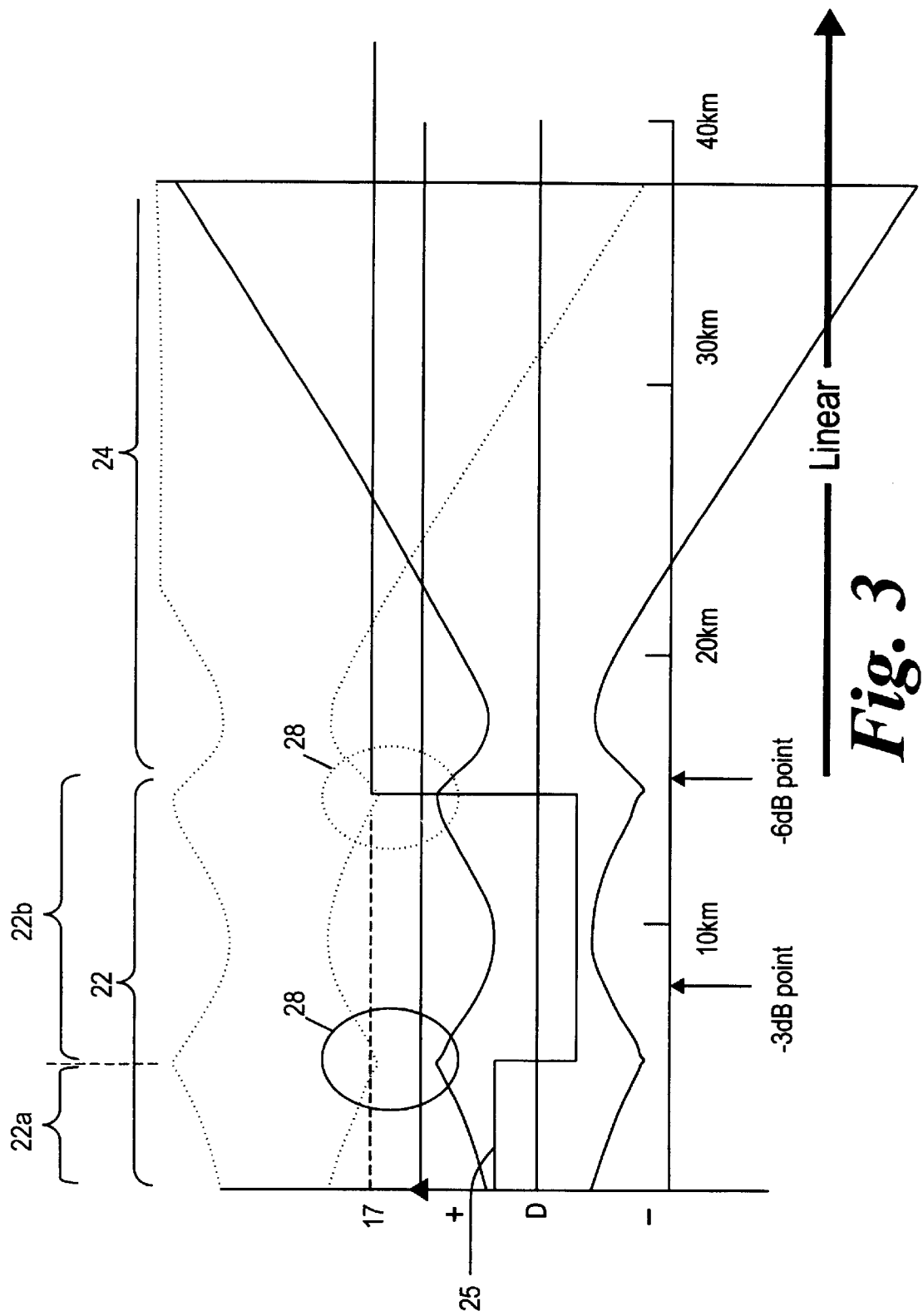
FIG. 3 illustrates the dispersion along the fiber for a second example of hybrid optical fiber span.

FIG. 3 shows a second example of fiber span arrangement. The second fiber section 24 is the same as in the example of FIG. 2. However, the first fiber section 22 comprises a first fiber length 22a and a second fiber length 22b. The first fiber length 22a has a positive dispersion characteristic at the operating wavelength, for example 5 ps/nm/km, whereas the second fiber length 22b has a negative dispersion characteristic, for example −5 ps/nm/km. Instead of using a number of alternating dispersion sections, the fiber of the first section may have longitudinally smoothly varying dispersion.

In the example shown in FIG. 3, the interface between the first and second fiber sections 22, 24 is at the 6 dB point, so that 75% of the signal attenuation occurs in the first fiber section 22. The first fiber section 22 in this case may be considered as a section of conventional dispersion managed fiber, as described above. At each fiber junction, the pulse width reaches a maximum and this defines the regions 28 where adjacent pulse interaction is most likely.

The transition between fiber sections preferably lies near to the point at which the sum of the signal impairments due to fiber nonlinearity and the signal impairment due to fiber loss for the first dispersion managed fiber section is equal to the sum of the signal impairments due to fiber nonlinearity and the signal impairment due to fiber loss for the second fiber section. This will typically be between 3 dB and 6 dB of signal attenuation, but depends upon the differences in spot size, nonlinearity and loss of the two fiber sections. This relationship ensures that the transition is at the point when it first becomes desirable to use the fiber type of the second section rather than the fiber type of the first section. At the front end of the fiber, the non-linear effects are dominant, so that the use of appropriate dispersion compensation results in lowest total loss. At the back end of the fiber, the fiber loss is dominant, so that the use of low loss fiber results in lowest total loss. The method described above for determining the transition point finds the optimum point along the fiber at which the fiber type of the second section becomes preferable over the fiber type of the first fiber section.

The dispersion of the fiber or fibers in the first fiber section will be selected as a function of the bit rate and pulse width of the system in which the fiber span is to be used. This bit rate dictates the pulse width and pulse separation, and thereby dictates the level of total dispersion which can be tolerated to avoid pulse overlap. The first fiber section also needs to be long enough that the non-linear fiber region, for example the first 3 dB of signal attenuation, arise in the first fiber section. Typically, larger negative dispersion values can only be achieved with smaller cores, and therefore at the expense of smaller effective areas which give rise to increased non-linear effects. For this reason, the first fiber section may require a number of fiber lengths as shown in FIG. 3.

By way of example, dispersion shifted fiber may typically have a loss of 0.25 dB/km, so that the length of the first fiber section may typically be around 12 km, whereas a typical span between repeaters or amplifiers will typically be around 80 km. For a 40 Gb/s system, the pulse width will typically be 12 ps with pulse-to-pulse spacing of 25 ps. The first fiber section should therefore not give rise to a total dispersion of more than 12 ps at any point within the first fiber section.

The fiber sections can be spliced together, which can be performed by conventional methods known to those skilled in the art.

Figure 4:
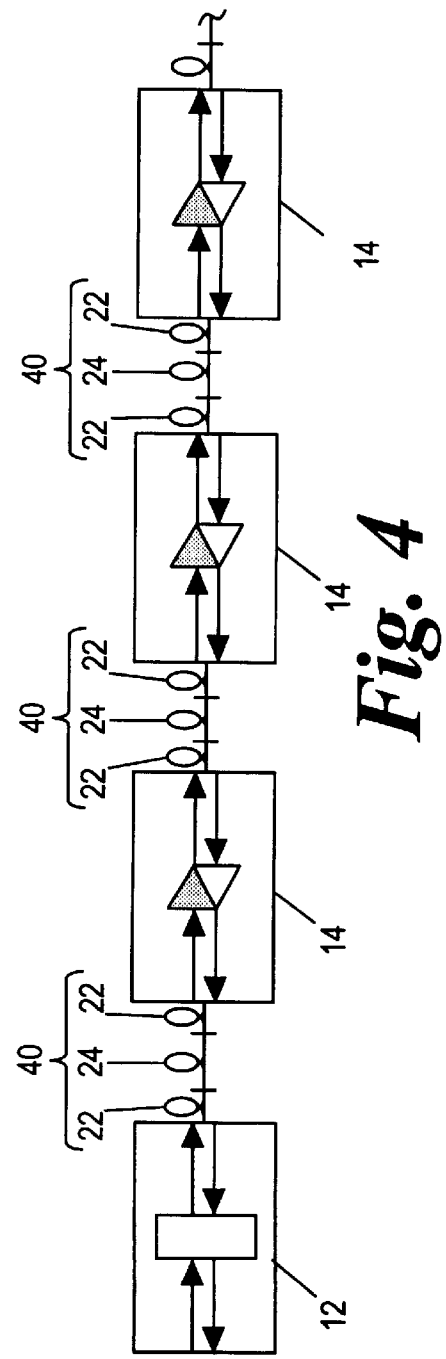
FIG. 4 is a schematic drawing of a second embodiment of hybrid optical fiber span in accordance with the invention.

FIG. 4 shows a second optical fiber span arrangement of the invention. In FIG. 1 separate fiber spans 20, 30 are provided between adjacent amplifiers or repeaters to enable bidirectional data flow. It is equally possible to provide a single bidirectional optical line 40 in which a first fiber section 22, as described above, is provided at each end of the fiber span, as shown in FIG. 4. The second fiber section 24 then occupies a central area of the total fiber span 40. As described above, the first fiber sections 22 typically require a length of between 10 and 15 km, which still leaves 50–60 km of low loss second fiber section 24 between adjacent components in the network, so that a reduction in signal loss can still be achieved.

This reduction in signal loss can either enable a longer span to be achieved between amplifiers or repeaters, or else the required launch power at the beginning of each span can be reduced, thereby reducing amplifier output power requirements. This also reduces fiber damage risk.

The second fiber section may be provided with Raman counter pumping. The lower loss of the second fiber section ensures that the Raman gain is provided at a greater distance from the receiver, which is optimum for signal to noise ratio and reach.

Various modifications will be apparent to those skilled in the art. The techniques by which optical fibers can be manufactured having desired dispersion characteristics have not been described in detail, as these will be apparent to those skilled in the art.

We claim:

1. A hybrid optical fiber, comprising:
    a first fiber section at an upstream end of the fiber comprising a fiber or a concatenation of fibers having first dispersion characteristics at a predetermined operating wavelength, the or at least one fiber of the first fiber section having a first effective area;
    a second fiber section at a downstream end of the fiber coupled to the first fiber section to form the hybrid fiber, the fiber of the second fiber section having a second effective area greater than the first effective area, wherein the first fiber dispersion characteristics are selected to maintain the signal dispersion within desired limits, and the second fiber is optical fiber having lower loss than the first fiber section.

2. A fiber according to claim 1, wherein the transition between fiber sections lies near to the point at which the sum of the signal impairments due to fiber nonlinearity and the signal impairment due to fiber loss for the first fiber section is equal to the sum of the signal impairments due to fiber nonlinearity and the signal impairment due to fiber loss for the second fiber section.

3. A fiber according to claim 1, wherein the first fiber section comprises fiber with a negative dispersion characteristic at the operating wavelength.

4. A fiber according to claim 1, wherein the first fiber section comprises a first fiber length with a positive dispersion characteristic at the operating wavelength and a second fiber length with a negative dispersion characteristic at the operating wavelength.

5. A fiber according to claim 1, wherein the second fiber section comprises non-dispersion shifted fiber, having positive dispersion at the operating wavelength.

6. A fiber according to claim 1, wherein the length of the first section is selected such that it attenuates the signal intensity by at least 3 dB.

7. A fiber according to claim 6, wherein the length of the first section is selected such that it attenuates the signal intensity by at least 6 dB.

8. A fiber according to claim 1, wherein the length of the first section is between 15 and 25% of the total length of the first and second fiber sections.

9. A fiber according to claim 1, wherein the first dispersion characteristics are selected such that the pulse width at the end of the first section avoids pulse overlap between adjacent pulses.

10. A fiber according to claim 1, wherein a first fiber section is provided at each end of the hybrid optical fiber, and the second fiber section is provided between the first fiber sections.

11. A fiber according to claim 1, wherein the second fiber section comprises Raman counter pumping.

12. An optical transmission system comprising a source for launching signals into a fiber, and an amplifier for receiving signals from the fiber, wherein the fiber comprises:
   a first fiber section at an upstream end of the fiber comprising a fiber or a concatenation of fibers having first dispersion characteristics at a predetermined operating wavelength, the or at least one fiber of the first fiber section having a first effective area;
   a second fiber section at a downstream end of the fiber coupled to the first fiber section to form the hybrid fiber, the fiber of the second fiber section having a second effective area greater than the first effective area, wherein the first fiber dispersion characteristics are selected to maintain the signal pulse broadening within desired limits, and the second fiber is optical fiber having lower loss than the first fiber section.

13. A system according to claim 12, wherein the amplifier comprises dispersion compensation elements for correcting the dispersion arising in the second fiber section.

14. A method for reducing the loss in a dispersion managed fiber, comprising the steps of:
   forming a hybrid optical fiber, comprising a first fiber section at an upstream end of the fiber comprising a fiber or a concatenation of fibers having first dispersion, characteristics at a predetermined operating wavelength, the or at least one fiber of the first fiber section having a first effective area, and a second fiber section at a downstream end of the fiber coupled to the first fiber section to form the hybrid fiber, the fiber of the second fiber section having a second effective area greater than the first effective area, wherein the first fiber dispersion characteristics are selected to maintain the signal dispersion within desired limits, and the second fiber is optical fiber having lower loss then the first fiber section; and
   coupling the hybrid fiber to a light source such that the first fiber segment is adjacent to the source.

15. A method for forming a dispersion managed fiber, comprising the steps of:
   selecting a first fiber section comprising a fiber or a concatenation of fibers having first dispersion characteristics at a predetermined operating wavelength which are selected to maintain the signal pulse broadening within desired limits, the or at least one fiber of the first fiber section having a first effective area;
   selecting a second fiber having lower loss than the first fiber section and having an effective area greater than the first effective area; and coupling the second fiber to the first fiber or fibers to form the hybrid fiber, with the first fiber section at an upstream end of the hybrid fiber and the second fiber section at a downstream end of the hybrid fiber.

* * * * *